United States Patent [19]
Maeda et al.

[11] Patent Number: 5,711,696
[45] Date of Patent: Jan. 27, 1998

[54] APPARATUS FOR MACHINING A WORKPIECE TO NON-REVOLUTE SYMMETRIC AND ASPHERICAL SURFACE

[75] Inventors: Yukio Maeda, Chiryu; Takao Taniguchi, Okazaki; Tetsuji Oasaka, Nagoya, all of Japan

[73] Assignee: Toyoda Koki Kabushiki Kaisha, Kariya, Japan

[21] Appl. No.: 429,639

[22] Filed: Apr. 27, 1995

[30] Foreign Application Priority Data

Apr. 28, 1994 [JP] Japan ................. 6-092609

[51] Int. Cl.$^6$ ................. B24B 49/00; B24B 51/00
[52] U.S. Cl. ................. 451/5; 451/6; 451/10; 451/11
[58] Field of Search ................. 451/5, 6, 9, 10, 451/11, 26, 21, 56, 72, 443

[56] References Cited

U.S. PATENT DOCUMENTS

| | | |
|---|---|---|
| 4,163,346 | 8/1979 | Matson ................. 451/11 |
| 4,274,231 | 6/1981 | Verega ................. 451/5 |
| 4,485,595 | 12/1984 | Minamiyama et al. ................. 451/26 |
| 4,631,869 | 12/1986 | Miyatake et al. ................. 451/11 |
| 4,656,787 | 4/1987 | Ueda et al. ................. 451/6 |
| 4,662,118 | 5/1987 | Brill et al. ................. 451/21 |
| 4,897,964 | 2/1990 | Vetter ................. 451/5 |
| 5,025,594 | 6/1991 | Lambert, Jr. et al. ................. 451/21 |
| 5,107,628 | 4/1992 | Kondo et al. . |
| 5,168,661 | 12/1992 | Pedersen et al. ................. 451/5 |
| 5,323,572 | 6/1994 | Guenin ................. 451/11 |

FOREIGN PATENT DOCUMENTS

| | | |
|---|---|---|
| 0 476 448 | 3/1992 | European Pat. Off. . |
| 1038435 | 8/1966 | United Kingdom . |
| 2 174 323 | 11/1986 | United Kingdom . |
| 2 250 223 | 6/1992 | United Kingdom . |
| 2 259 662 | 3/1993 | United Kingdom . |
| WO 93/24274 | 12/1993 | WIPO . |

OTHER PUBLICATIONS

Japio Abstract Section M, No. 1494, vol. 17, No. 562, p. 133, Oct. 22, 1993, JP-5-162005, Jun. 29, 1993.

*Primary Examiner*—James G. Smith
*Assistant Examiner*—Derris H. Banks
*Attorney, Agent, or Firm*—Oblon, Spivak, McClelland, Maier & Neustadt, P.C.

[57] ABSTRACT

An apparatus for machining a workpiece which has a non-revolute symmetrical and aspherical surface with a rotating grinding wheel. The apparatus comprises a workpiece supporting member supporting the workpiece and a wheel head providing the grinding wheel an outer peripheral surface of which takes a form of a part of a spherical shape. The workpiece and the grinding wheel are relatively moved by a first drive mechanism in an infeed direction, the workpiece supporting member and the wheel head are relatively moved by a second drive mechanism in a traverse feed direction perpendicular to the infeed direction, and the workpiece supporting member and the wheel head are relatively moved by a third drive mechanism in a pitch feed direction perpendicular to both of the infeed direction and the traverse feed direction. A truing device is moved by the second drive mechanism in the traverse feed direction relative to the grinding wheel, and has a truing element rotatable about an axis perpendicular to a rotational axis of the grinding wheel through a spherical center thereof. The first, second and third drive mechanisms are controlled by a control device based upon the aspherical shape data for the workpiece.

3 Claims, 5 Drawing Sheets

APPARATUS FOR MACHINING A WORKPIECE TO NON-REVOLUTE SYMMETRIC AND ASPHERICAL SURFACE

BACKGROUND OF THE INVENTION

1. Filed of the Invention

The present invention relates to an apparatus for machining an optical part for use in a laser printer and the like. More particularly, the present invention relates to an apparatus for machining a workpiece having a non-revolute symmetric and aspherical surface.

2. Discussion of the Related Art

In a case of machining a workpiece which has a non-revolute symmetric and aspherical surface, such as an optical part for use in a laser printer and the like, heretofore, the workpiece is machined by a machining center or a grinding center comprising three controllable axes which provide a tool having an almost semi-spherical shape such as a ball-end-mill. In these machining apparatuses, the workpiece is machined with simultaneously the simultaneous control of the three axes of an X, Y and Z axis. Moreover, in another machining method, the machining operation is carried out repeatedly and respectively by moving the workpiece and the grinding wheel with the simultaneous two axes control of the X and Z axis, and then by moving the grinding wheel in the Y-axis direction by a predetermined amount. In the aspherical surface machining apparatuses as described above, there is provided a truing device which has a drive mechanism for a truing element pivotable around a center of the grinding wheel to true the grinding wheel into the spherical shape, and a measuring device which has a touch sensor etc. for measuring a radius of the grinding wheel after the truing operation.

In the conventional machining apparatuses as described above, it is required for the truing element to be pivotable around the center of the grinding wheel to true the grinding wheel into the spherical shape, so that the drive mechanism of the truing device is brought into a complexity, thereby causing a cost up. Further, because of the complexity of the drive mechanism, a movement error in the drive mechanism often occurs, whereby it is a very difficult problem to perform the truing operation in a highly accurate manner.

Moreover, the grinding wheel itself has a tendency to be expanded in a radial direction during the rotation of the grinding wheel, so that it is difficult to accurately measure the actual radius of the rotating grinding wheel with such a measuring device which measures the grinding wheel radius by using the touch sensor directly contacting the rotating grinding wheel. Therefore, an error occurs in measured data of the grinding wheel radius which is measured when the grinding wheel is not rotated that influences the machining data for the workpiece by the rotating grinding wheel error, so that it is a problem to not be able to machine the workpiece into an accurate aspherical shape.

SUMMARY OF THE INVENTION

Accordingly, a primary object of the present invention is to provide for an apparatus for machining a workpiece having a non-revolute symmetric and aspherical surface in which a grinding wheel can be trued by a truing device in the form of a simple constitution.

Another object of the present invention is a provide for an apparatus for machining a workpiece having a non-revolute symmetric and aspherical surface in which a measuring device is provided to measure a radius of a rotating grinding wheel in a highly accurate manner.

Briefly, according to the present invention, there is provided an apparatus for machining a workpiece which has a non-revolute pair and non-spherical surface with a rotating grinding wheel in the form of a disk. The apparatus comprises a workpiece supporting member supporting the workpiece, a wheel head providing the grinding wheel an outer surface of which takes the form of a part of a spherical shape, first drive means for relatively moving the workpiece and the grinding wheel in an infeed direction, second drive means for relatively moving the workpiece supporting member and the wheel head in a traverse feed direction perpendicular to the infeed direction, third drive means for relatively moving the workpiece supporting member and the wheel head in a pitch feed direction perpendicular to both of the infeed direction and the traverse feed direction, a truing device mounted on a portion which is moved by the second drive means in the traverse feed direction relative to the workpiece, and having a truing element rotatable about an axis perpendicular to a rotational axis of the grinding wheel through a spherical center thereof, and control means for controlling the first, second and third drive based upon the non-spherical shape data for the workpiece.

With this configuration, the workpiece supporting member and the wheel head are relatively moved by the third drive means by the predetermined pitch, and then the machining operation over the whole machined surface of the workpiece is performed by relatively moving the workpiece supporting member and the wheel head by the second drive means in the traverse feed direction and by relatively moving then by the first drive means in the infeed direction simultaneously. In time of truing of the grinding wheel, the truing element of the truing device is positioned to a position that a grinding wheel center of the grinding wheel coincides with a rotational axis center of the truing element. Thereafter, in case that the grinding wheel and the truing element are rotated respectively, the truing operation is carried out in case that the outer peripheral surface of the grinding wheel is contacting a circular inner end edge of the truing element, by infeeding the grinding wheel toward the truing element. As a result, the outer peripheral surface of the grinding wheel can be accurately trued to a spherical shape having an equal radius from the grinding wheel center.

In another aspect of the present invention, there is provided a stroboscope flashing to the grinding wheel at a predetermined time interval, a microscope arranged opposite to the stroboscope, and a monitor for displaying through a television camera a picture at an edge of the grinding wheel which is enlarged by the microscope.

With this configuration, in case of measuring the radius of the grinding wheel, the rotating grinding wheel is moved between the stroboscope and the microscope by the first drive means, and further the grinding wheel is positioned to respective position that right and left end portion contact a center line of a display on the monitor. Therefore, the grinding wheel radius can be obtained by measuring the respective position and by calculating the difference between the measured respective position.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which:

3

Figure 3A:
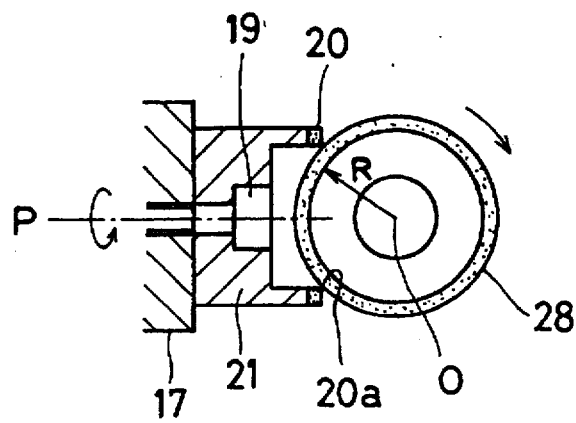
Figure 3B:
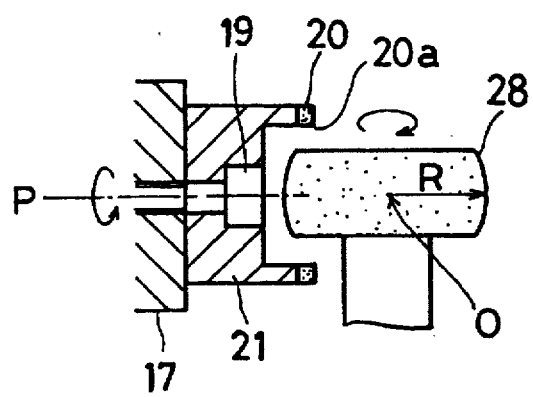
Figure 3C:
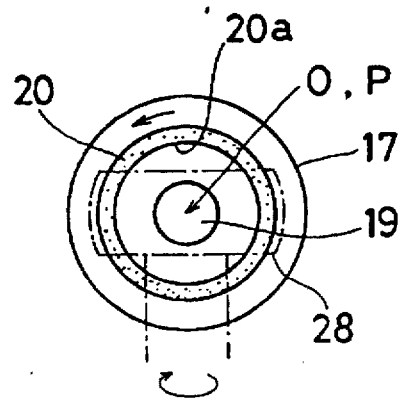
Figure 4:
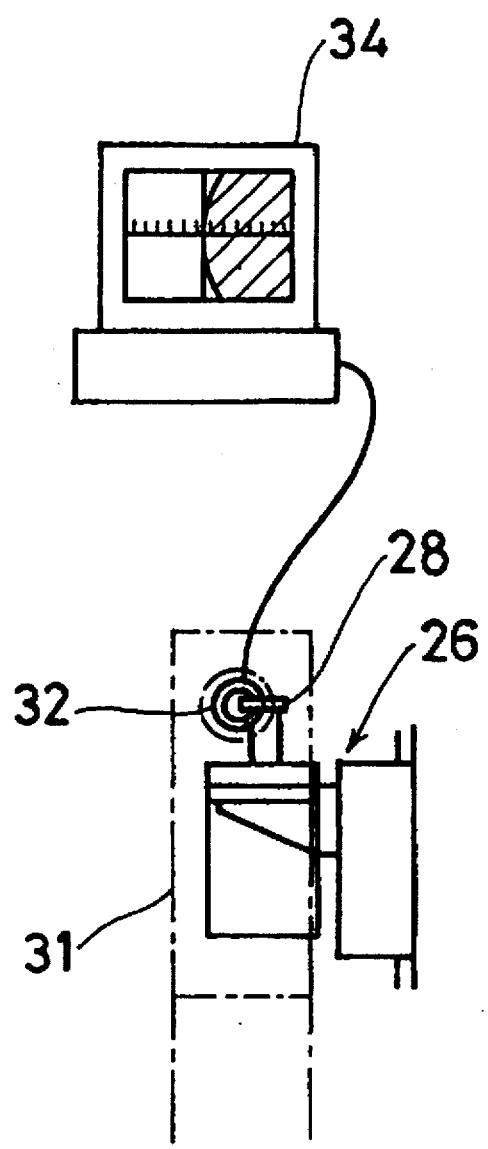
Figure 5:
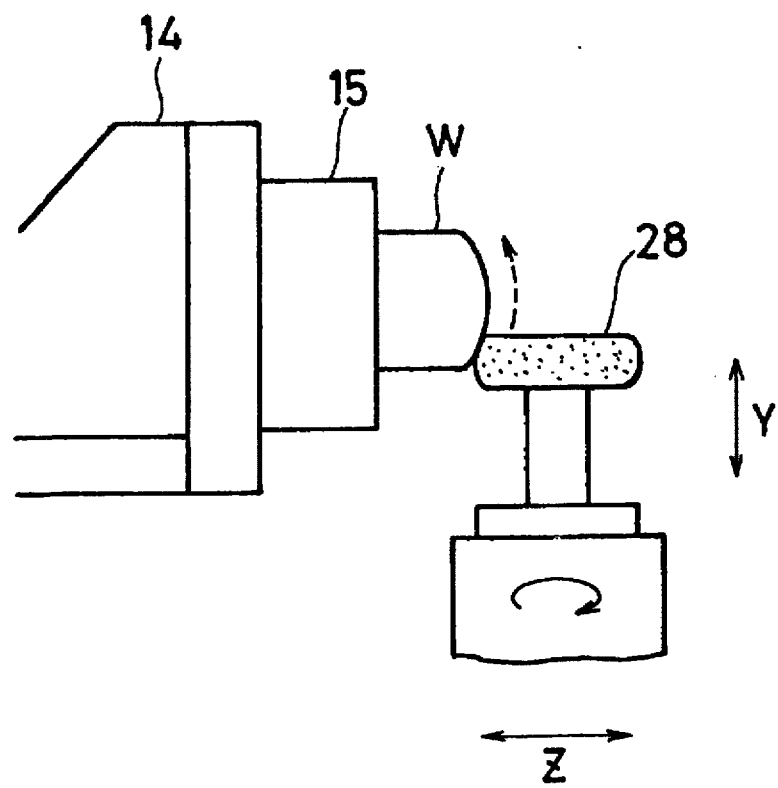
Figure 6:
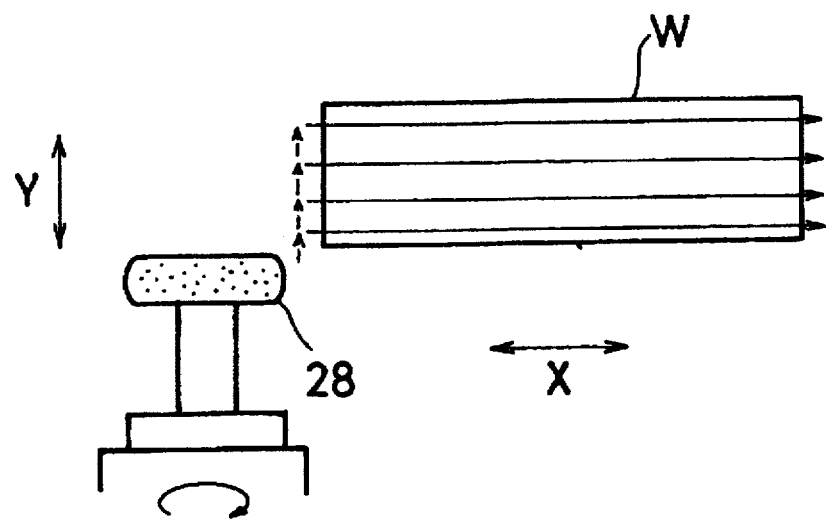

FIGS. 3(a), 3(b) and 3(c) are explanatory views showing a way of truing a grinding wheel;

FIG. 4 is an explanatory view showing a way of measuring a radius R of the grinding wheel;

FIG. 5 is an explanatory view showing the relationship between a workpiece W and the grinding wheel; and FIG. 6 is an explanatory view showing a way of machining the workpiece W.

DETAILED DESCRIPTION OF THE PREFERRED EMBODIMENTS

Figure 1:
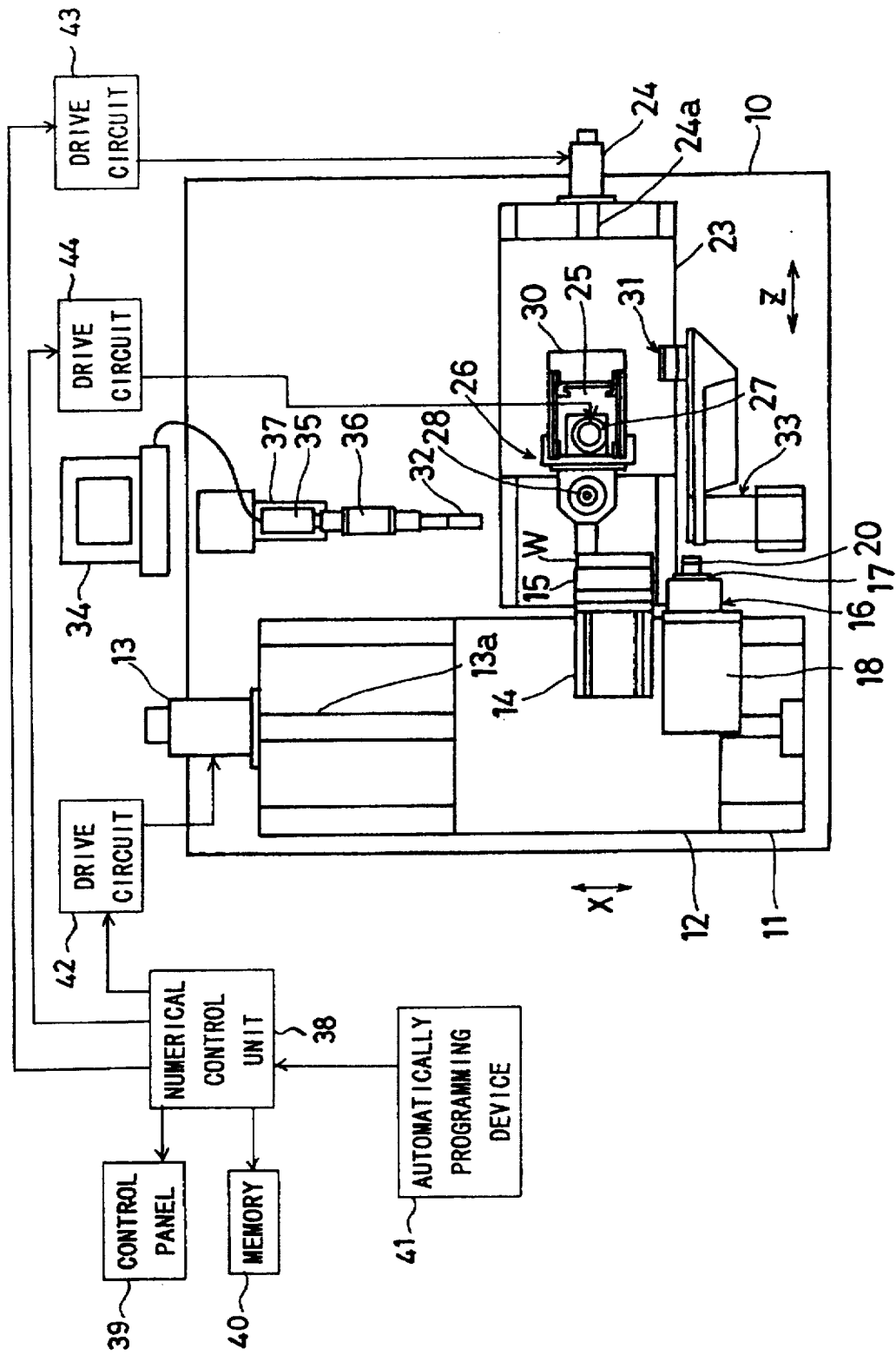
FIG. 1 is a block diagram of a numerical controller with an automatically programming unit, illustrating a plan view of a machine tool according to the present invention.
Figure 2:
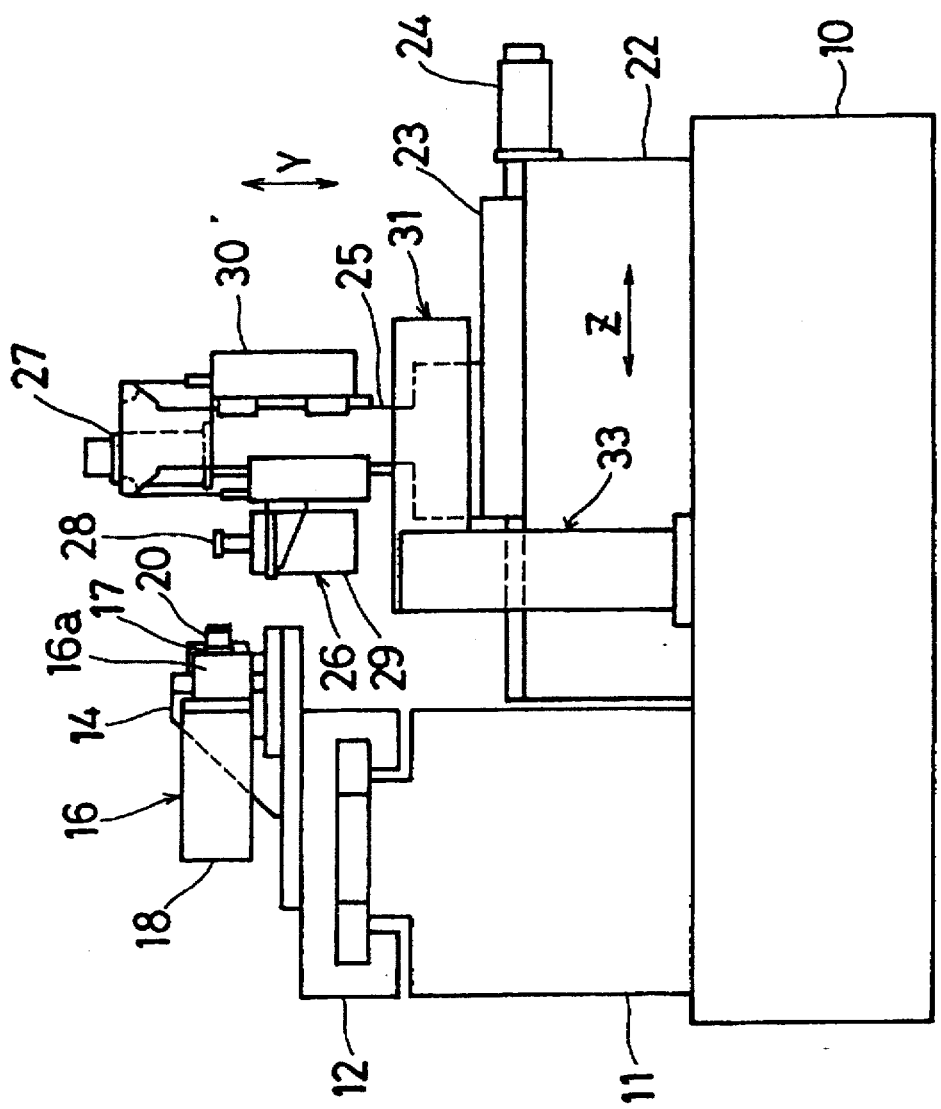
FIG. 2 is a side view of the machine tool.

Referring now to FIGS. 1 and 2, numeral 10 denotes a bed, and numeral 11 denotes a workpiece guide base fixed on the bed 10 on which a workpiece slide table 12 is movably mounted in an X-axis direction, that is a traverse direction.

The workpiece slide table 12 is controllably fed in the X-axis direction by a ball screw 13a which is rotated by a servomotor 13 mounted on the workpiece guide base 11.

On the workpiece slide table 12, a workpiece supporting base 14 is fixed, in front of which a vacuum chuck 15 is provided to support a workpiece W, and further, a truing device 16 is fixed in parallel to and apart from the workpiece supporting base 14 in the X-axis direction.

In a main body 16a of the truing device 16, a truing spindle 17 is arranged rotatably about an axis parallel to a Z-axis perpendicular to the X-axis, and is rotated by an electric motor 18. As shown in FIGS. 3(a), 3(b) and 3(c), a base portion 21 for a truing element 20 is fixed to a side end of the truing spindle 17 by being secured with a bolt 19, and the truing element 20 is formed at a top end of a tubular protrusion formed on the base portion 21.

The truing operation is performed by infeeding a grinding wheel 28 so as to move a center O of the grinding wheel 28 along a rotational center line P of the truing spindle 17, so that an outer surface of the grinding wheel 28 contacts a circular inner end edge 20a of the truing element 20 with line contact, thereby being precisely trued to a spherical surface. The arrangement of the grinding wheel 28 will be described in detail hereafter.

The opening inner end portion of the truing element 20 can be formed with a taper or round shape. When the opening inner end portion of the truing element 20 is formed with the taper or round shape, the outer surface of the grinding wheel 28 contacts the opening inner end portion of the truing element 20 with a line or surface contact, respectively, so that the wear amount by truing operation can be diminished as compared to that when the opening inner portion takes the form of a sharpened edge shape as described above.

Referring back to FIGS. 1 and 2, numeral 22 denotes a grinding wheel guide base fixed on the bed 10 of a near side to the workpiece guide base 11, on which a grinding wheel slide table 23 is movably arranged in the Z-axis direction perpendicular to the X-axis direction, that is an infeed direction. The grinding wheel slide table 23 is controllably infed in the Z-axis direction by a ball screw 24a rotated by a servomotor 24 which is mounted on the grinding wheel guide base 22.

On the grinding wheel slide table 23, a column 25 is vertically arranged which provides a grinding wheel head 26 at a side thereof opposite to the workpiece W. The grinding wheel head 26 is controllably fed in a Y-axis direction, that is a pitch feed direction, perpendicular to the both X-axis and Z-axis directions, by a ball screw (not shown) rotated by a servomotor 27 which is mounted on the column 25.

At the grinding wheel head 26, the grinding wheel 28 whose outer peripheral surface thereof takes the form of a spherical surface is rotatably arranged about a vertical axis perpendicular to the rotational axis P of the truing element 20, by an electric motor 29.

In FIGS. 1 and 2, numeral 30 denotes a counter balance weight connected to the grinding wheel head 26 by a wire and the like.

Further, a stroboscope 31 and a microscope 32 are oppositely arranged on the bed 10 for measuring a radius of the grinding wheel 28 precisely. The stroboscope 31 is composed of an optical source flashing at a predetermined time interval, a reflector reflecting a flashlight, and lenses for focusing the flashlight, and is pivoted about an axis parallel to the X-axis with a swinging device 33 by 90 degrees. The stroboscope is always supported at a horizontal position as shown in FIGS. 1 and 2, but is pivoted by 90 degrees to be positioned at a position shown by the one-dot chain line in FIG. 4 when measuring the radius of the grinding wheel 28.

The microscope 32 is secured to a supporting frame 36 together with a television camera 35 for sending a picture enlarged by the microscope 32 to a display 34. The supporting frame 38 is secured to a piston rod (not shown) of a hydraulic cylinder 37, so that the microscope 32 and television camera 35 are advanced and retracted in the X-axis direction due to the operation of the hydraulic cylinder 37.

A grinding wheel radius measuring unit is composed of the stroboscope 31, microscope 32 and display 34.

In FIG. 1, numeral 38 denotes a numerical control unit for controlling the machining apparatus in whole which is connected to a control panel 39, a memory 40 storing measuring and machining programs, and an automatically programming device 41 for calculating machining data (X, Y, Z) by inputting compensation data of a radius R in the grinding wheel 28.

Further, the numerical control unit 38 is connected to drive circuits 42, 43 and 44 respectively for driving the servomotors 13, 24 and 27 in accordance with drive instruction signals which are output from the numerical control unit 38 based upon the machining program and shape data of the workpiece W.

The aforementioned machining data (X, Y, Z) represents surface data calculated by the automatically programming device 41 that separates by the amount of the grinding wheel radius R from a machining point on the workpiece W, i.e., a locus of the grinding wheel center O. In a machining operation, since the outer peripheral surface of the grinding wheel 28 is in the form of the spherical surface, the workpiece W is machined by moving the grinding wheel 28 such that a line connecting the machining point on the workpiece W with the grinding wheel center O always coincides with the normal in that machining point, as clearly showing in FIG. 5.

Next, the operation of the machining apparatus constructed above will now be described hereinafter.

In the case of machining the workpiece W to aspherical surface, the numerical control unit 38 is first operated in accordance with the machining program, so that a traverse drive command signal according to the machining data (X, Y, Z) are input through the drive circuit 42 to the servomotor 13, whereby the workpiece slide table 12 with the workpiece W is moved in the X-axis direction to move the workpiece W to a machining start position. Successively, since an infeed command signal is input from the numerical control unit 38 through the drive circuit 43 to the servomotor 24, the wheel head 26 on the wheel slide table 23 is infed in the Z-axis direction as shown in FIG. 5. In this situation, the workpiece W is ground with one-path machining along the X-axis by simultaneously controlling two axes of the X-axis and Z-axis, as shown by the solid-line arrow in FIG. 6, in order to make a desired aspherical shape of the workpiece in the X and Y axes directions.

In succession to the machining end of the workpiece W with the one-path machining described above, a pitch-feed drive instruction signal based upon the machining program and the shape data is added to the servomotor 27 from the numerical control-unit 38 through the drive circuit 44, so that the wheel head 26 is moved by one pitch in the Y-axis direction as shown by the one-dot arrow in FIG. 6.

After the wheel head 26 has been pitch-fed by one-pitch in the Y-axis direction, the simultaneous two axes control is performed in relation to the X-axis and Z-axis, in this case the amount of the position of the grinding wheel 28 includes the different amount of the shape of the workpiece W in the Z-axis direction from that in previous traverse feed, so that the workpiece W is ground with the one-path machining.

The whole surface of the workpiece W is machined to aspherical surface in accordance with the shape data by repeating similar operation described above.

In the machining method in the aforementioned embodiment, i.e., in the machining method that the whole surface of the workpiece w is ground by repeating that the wheel head 26 is fed by one pitch in the Y-axis direction with Z-axis compensation after the one-path machining is carried out with the simultaneous two axes control, even when it is used that the feed mechanism of only the Y-axis is different in worse slide accuracy from the other feed mechanisms of the X-axis and Z-axis (e.g., the feed mechanisms of the X-axis and Z-axis use of the type such as hydrostatic bearing, and that of the Y-axis uses of the type such as roller bearing), the error due to the difference in slide accuracy (e.g., the error due to following delay etc. of the Y-axis) does not occur during machining, so that the machining operation is carried out in high accuracy.

In the above-described embodiment, it may be possible to machine the workpiece W with the simultaneous three axes control (X-, Y- and Z-axis). In such a case, it is preferable to use same feed mechanisms in accuracy for the three axes not to occur the error due to the difference in slide accuracy, for example, it can be realized to machine the workpiece W accurately in a case that the hydrostatic bearings are used in the three axes.

After the machining operation of the workpiece W, the workpiece slide table 12 is moved to a position that the rotational center P of the truing element 20 on the truing device 16 coincides with the rotational center line O of the grinding wheel 28.

Next, in case that the truing element 20 and grinding wheel 28 are rotated, the grinding wheel 28 is trued by infeeding the wheel slide table 23, as shown in FIGS. 3(a), 3(b) and 3(c). In this case, it is required to rotate the grinding wheel 28 at a lower rotational speed than that of the truing element 20. By this infeed movement, the circular inner end edge 20a at the opening end of the truing element 20 is brought into line contact with the outer surface of the grinding wheel 28. In this situation, by further infeeding the grinding wheel 28 in relation to the truing element 20 by a predetermined amount, the outer surface of the grinding wheel 28 is accurately trued to the spherical surface shape with the uniform radius R from the wheel center O.

After the truing operation of the grinding wheel 28, the method for measuring the radius R of the grinding wheel 28 will be explained hereinafter.

First, the stroboscope 31 is pivoted by the swinging device 33 by 90 degrees, thereby moved to a position opposite to the microscope 32, as shown in FIG. 4. On the other hand, the microscope 32 is advanced to the measuring position due to the operation of the hydraulic cylinder 37.

Successively, in the case of rotating of the grinding wheel 28, a control panel 39 is operated by an operator so that the wheel slide table 23 is moved by the manual operation in the Z-axis direction, whereby the grinding wheel 28 is positioned to a position that the right end of the grinding wheel 28 contacts a center line displayed on the display 34. At this time, the coordinate value for Z-axis direction position is read by the operator, and is stored to the memory 40 as Z1.

Next, the left end of the grinding wheel 28 is measured in a similar manner that the right end of the grinding wheel 28 was measured as described above, so that the coordinate value for Z-axis direction position at this time is stored to the memory 40 as Z2, whereby the radius R of the grinding wheel 28 is calculated as follows.

$$R=(Z1-Z2)/2$$

In this situation, if the frequency of the flash which is flashed from the optical source of the stroboscope 32 is set to integral number times of that of the rotation of the grinding wheel 28, the accurate picture of the grinding wheel 28 is displayed on the display 34, so that the radius R of the grinding wheel 28 can be measured in high accuracy.

Next, the measured radius R of the grinding wheel 28 is input to the automatically programming device 41 as a compensation data in order to calculate the machining data (X, Y, Z) again and then, the calculated machining data is output to the numerical control unit 38, so that the next machining operation is performed based upon the accurately calculated machining data.

In the above-described embodiment, when the radius R of the grinding wheel 28 is not measured, the stroboscope 31 is pivoted to the horizontal position by the swinging device 33, so that the workability can be improved in time of changing of the workpiece W and the grinding wheel 28.

Further, in the above-described embodiment, it can be automatically performed that the Z-axis direction position Z1 and Z2 at the both ends of the grinding wheel 28 is stored to the memory 40 in order, that the wheel radius R is calculated from the coordinate values Z1 and Z2, that the machining data (X, Y, Z) is calculated from the calculated wheel radius R again, and that the calculated machining data is output to the numerical control unit 38. In such a case, it is required to use a memory storing an automatically measuring program for measuring the wheel radius R, a wheel radius calculation program for calculating the wheel radius R from the measured coordinate value Z1 and Z2, and a machining data calculation program for calculating the machining data again based upon the calculated wheel radius R.

Obviously, numerous modifications and variations of the present invention are possible in light of the above teachings. It is therefore to be understood that within the scope of the appended claims, the present invention may be practiced otherwise than as specifically described therein.

What is claimed is:

1. An apparatus for machining a workpiece which has a non-revolute symmetric and aspherical surface with a rotating grinding wheel, said apparatus comprising:
   a workpiece supporting member supporting said workpiece;
   a wheel head providing said grinding wheel an outer surface of which takes the form of a pan of a spherical shape;
   first drive means for relatively moving said workpiece supporting member and said wheel head in an infeed direction;
   second drive means for relatively moving said workpiece supporting member and said wheel head in a traverse feed direction perpendicular to said infeed direction;
   third drive means for relatively moving said workpiece supporting member and said wheel head in a pitch feed direction perpendicular to both of said infeed direction and said traverse feed direction;
   a truing device moved by said second drive means in said traverse feed direction relative to said grinding wheel, and having a truing element rotatable about an axis perpendicular to a rotational axis of said grinding wheel through a spherical center thereof;
   control means for controlling said first, second and third drive means based upon aspherical shape data for said workpiece; and
   a grinding wheel radius measuring device for measuring a radius of said workpiece, said grinding wheel radius measuring device being composed of a stroboscope flashing toward said grinding wheel at a predetermined time interval, a microscope arranged opposite to said stroboscope, and a display for displaying through a television camera a picture at an end of said grinding wheel which is enlarged by said microscope.

2. An apparatus according to claim 1, wherein said truing element takes the form of a tubular shape an inner peripheral edge of which comes into contact with said spherical shape of said grinding wheel.

3. An apparatus according to claim 1, said apparatus further comprising:
   an automatically programming unit for compensating the shape data used in said control means based upon said measured grinding wheel radius by said grinding wheel radius measuring device, to output a compensated machining data to said control means.

* * * * *